United States Patent Office 3,838,076
Patented Sept. 24, 1974

---

3,838,076
POLYURETHANE FOAMS FROM PARTIALLY AMINATED POLYETHER POLYOLS
Philip Hotchkiss Moss and Michael Cuscurida, Austin, Tex., assignors to Jefferson Chemical Company, Inc., Houston, Tex.
No Drawing. Filed Mar. 12, 1973, Ser. No. 339,988
Int. Cl. C08g 22/44, 22/14
U.S. Cl. 260—2.5 AQ
5 Claims

ABSTRACT OF THE DISCLOSURE

Cellular polyurethane foams are prepared by reacting, in the presence of a blowing agent, an organic polyisocyanate and a polyoxyalkylene resin having a functionality of from 2 to 8 and an equivalent weight of from about 900 to about 2800. The terminal groups of the polyoxyalkylene resins are from 15 to about 55 amino groups, with the remaining functional groups being hydroxyl groups.

BACKGROUND OF THE INVENTION

In the field of polyurethane foams the foam has been heretofore produced by reacting an organic polyisocyanate, in the presence of a blowing agent and, usually, a catalyst, with polyoxyalkylene, or polyether, polyols. The rate of the reaction and the time required for the foam to rise and cure was determined in large part by the catalyst level. In many commercial operations it was desirable to decrease these times in order to improve the productivity and output per unit time. In an attempt to do so, practictioners in the art added more catalyst. This would decrease the cream time to the point where the reaction would be hard to control or desired properties of the resulting foam would be lost such that the product becomes unacceptable commercially.

The polyols used were generally terminated with secondary hydroxyl groups which it was found reacted at a slower rate with the polyisocyanate group than do primary hydroxyl groups. The next step in attempting to solve this reaction rate and cure rate problem was to incorporate into the polyol structure terminal primary hydroxyl groups. This was done by preparing polyether polyols in the known way by reacting an initiator with propylene oxide and then with ethylene oxide to incorporate the termial primary hydroxyl groups. The preparation of such polyols are described for example in U.S. Pats. 3,336,242 and 3,535,307.

Use of polyols such as this have found wide acceptance in the polyurethane industry, particularly in the production of flexible polyurethane foam. They are found to give an acceptable reaction time as determined by "cream" and rise times but the cure, or "gel," times were inherent properties of the reaction with the isocyanate when the ethylene oxide capped polyether polyols were used and could not be varied without changing the cream or rise time or without altering desired properties of the foam.

It has long been known that a primary amine group reacts with an isocyanate group in an almost instantaneous reaction which is almost impossible to control to the point of satiisfactory foam production. The same is true when an amine-terminated material is mixed with the hydroxyl terminated polyether polyol. When the quantity of the amine in such a blend is reduced to a point where manageable reaction rates result, there is no improvement in the cure time and the reaction dynamics inherent in the polyether polyol reaction mask any possible change due to the presence of the amine-terminated material in the blended polyol and often the physical properties of the resulting foam are impaired.

Accordingly, it is the object of this invention to provide a polyoxyalkylene resin which when reacted with an organic polyisocyanate has a decreased cure, or "gel," time while maintaining manageable cream and rise times substantially equivalent to that of the hydroxyl terminated polyether polyols and, further, while maintaining the outstanding properties of the resulting polyurethane foam.

SUMMARY OF THE INVENTION

We have surprisingly discovered that certain polyoxyalkylene resins wherein from 10% to 50% of the terminal hydroxyl groups of a polyether polyol are replaced with primary amine groups are reacted with organic polyisocyanates to form polyurethane foams having outstanding physical properties. These resins are produced from polyether polyols having a functionality of from about 2 to about 8 and an equivalent weight of from 900 to about 2800 (hydroxyl number from 20 to about 60) by reacting the polyol with ammonia to achieve the desired degree of amination. The reaction with the polyisocyanate resulting from the use of these polyoxyalkylene resins partially terminated with primary amine groups occur at rates substantially equivalent to the rate of reaction using the polyoxyalkylene polyol alone, yet the cure time, or gel time, surprisingly is decreased, thus resulting in shorter overall cycle times and greater productivity of polyurethane foam.

DESCRIPTION OF THE PREFERRED EMBODIMENT

The polyoxyalkylene resin used in the practice of our invention to produce polyurethane foams is prepared by partially aminating to the extent of about 10% to 50% of terminal hydroxyl groups of polyoxyalkylene polyols having a functionality of from 2 to 8 and an equivalent weight of from about 900 to about 2800 (hydroxyl number of about 20 to about 60) by reacting ammonia with said polyoxyalkylene polyol at elevated temperatures and pressure in the presence of hydrogen and a hydrogenation-dehydrogenation catalyst. A preferred method for performing the process for preparing such partially aminated polyether polyols is described and exemplified later herein.

The remaining functional groups of the polyoxyalkylene resin useful in the practice of our invention are hydroxyl groups and can be either primary or secondary hydroxyl groups. As stated heretofore from 15% to 55% of the hydroxyl groups are replaced with amine groups. It is preferred that about 17% to about 47% be amine groups and especially preferred that from about 20% to about 30% be amine groups. Where the polyether polyol starting material has both primary and secondary hydroxyl groups, the partially aminated polyoxyalkylene resin used in the practice of this invention may have from about 45% to about 85% primary hydroxyl groups and 0 to about 25% secondary hydroxyl groups. It is preferred that the primary hydroxyl groups be from about 50% to about 65% and the secondary hydroxyl groups from 0 to about 15%.

The polyether polyols which are partially aminated are prepared by adding an alkylene oxide to a suitable polyhydric initiator having from 2 to 8 reactive hydroxyl groups until an equivalent weight of from about 900 to about 2800 is obtained. The reaction is well known to those skilled in the art and suitable initiators and alkylene oxides are described in U.S. Pats. 3,655,590; 3,535,307 and 3,194,773 for example. Preferred initiators are, for example, ethylene glycol, propylene glycol, glycerol, trimethylolpropane, sorbitol, sucrose, methyl glucoside and the like. The preferred initiators would be those having two or three reactive hydrogen atoms, for example, propylene glycol, ethylene glycol, glycerol, trimethylolpropane, and the like.

The alkylene oxide used may be ethylene oxide, propylene oxide, butylene oxide or higher alkylene oxides having up to 18 carbon atoms or mixtures thereof. When mixed oxides are used, they may be added to the polyhydric initiator either sequentially to form blocked polyether polyols as described in U.S. Pat. 3,535,307, or may be mixed and reacted simultaneously to form a random, or heteric, oxyalkylene chain. If desired, terminal primary hydroxyl groups can be achieved by reacting ethylene oxide in a last step as described, for example, in U.S. Pat. 3,535,307 or 3,336,242. This primary hydroxyl termination can be from about 15% to about 80% of the hydroxyl groups on the polyoxyalkylene polyol. The reaction of the alkylene oxides with the polyhydric initiator is well known to those skilled in the art and occurs under basic conditions established through the use of alkali metals, their hydroxides, oxides and hydrides and in some cases basic amines.

The molecular weight can be determined by analysis for the hydroxyl number which is proportional to the hydroxyl concentration per unit weight. The hydroxyl number is defined in terms of KOH equivalent per gram of alkylene oxide-initiator reaction product and is determined using well known methods. The equivalent weight, of course, bears a relationship to the molecular weight based upon the number of hydroxyl groups in the molecule and is determined from the hydroxyl number by using the following formula:

$$\text{Eq. W.} = \frac{56.1 \times 1000}{\text{OH Number}}$$

The equivalent weight of the polyol used for amination and that of the aminated product itself for purposes of the practice of our invention will be substantially the same since a hydroxyl group having a molecular weight of 17 is replaced by an amino group having a molecular weight of 16. The equivalent weight of the polyoxyalkylene resins useful for the practice of our invention, as stated heretofore, is from about 900 to about 2800 with a preferred range of about 1500 to about 2300. This latter preferred range is particularly applicable when difunctional or trifunctional materials are used.

The polyoxyalkylene resins useful in the practice of our invention are prepared by reacting the above described polyether polyols with ammonia in the presence of a hydrogenation-dehydrogenation catalyst at elevated temperatures and pressures in the presence of hydrogen. While many catalysts are useful for this reaction, the preferred catalyst is prepared by reducing a mixture of the oxides of nickel, copper and chromium as described in U.S. Pat. 3,152,998. The reaction is carried out from about 160 to about 250 degrees C. at a reaction pressure of from 750 to about 4000 p.s.i.g. with the hydrogen partial pressure of at least about 300 p.s.i.g. The reaction can be carried out either continuously or in a batch manner. An example follows describing the production of the polyoxyalkylene resin useful in the practice of our invention.

Example A: Preparation of Polyoxyalkylene Resin

This example will illustrate the preparation of the partially polyoxyalkylene resin used in the practice of our invention. A polyoxyalkylene triol having a hydroxyl number about 25.5 and capped with ethylene oxide to give 65% primary and 35% secondary hydroxyl groups, was pumped at a rate of 1.70 pounds per hour through a fixed bed continuous catalytic reactor 59.5 inches long and having a 1.25 inch internal diameter. The vertical reactor contained 1000 ml. of a pelleted nickel-copper-chromia catalyst (see U.S. Pat. 3,152,998) having about 70 mol percent nickel, 22 mol percent copper and 3 mol percent chromium on an oxide-free basis. The second reactor feed was anhydrous ammonia, introduced to the same reactor at 0.20 pound per hour. A 75% hydrogen/25% nitrogen (mol ratio) gas was passed through the reactor at a rate of 160 liters per hour (standard temperature and pressure). Conditions were 1000 p.s.i.g. and 194–198° C. for the 5.5 hour run. Product, which contained traces of catalyst fines, was filtered through filter aid and then stripped free of ammonia and water at final conditions of 110° C. and 2 mm. A light colored, clear viscous liquid weighing 3500 g. was recovered. Titration of a sample of the product in isopropanol solution with 0.1993 N Hydrochloric acid showed that 23% of the hydroxyl groups had been converted to amino groups. By Kjeldahl analysis, nitrogen content was 0.14% and total acetylatables was 0.375 meg./g.

While the above example is useful for instructional purposes, it should not be deemed limiting and polyoxyalkylene resins as described herein are useful in my invention and can be manufactured by any method known to those skilled in the art.

In order to form polyurethane foams using the polyoxyalkylene resin prepared as above described, several other ingredients are essential; foremost, of course, is an organic polyisocyanate. An organic isocyanate reacts directly with the active hydrogen atoms of the polyoxyalkylene resin. The organic isocyanate may be difunctional such as toluene diisocyanate or one of the polyfunctional polyaryl isocyanates such as polymethylenepolyphenylisocyanate. These polyaryl isocyanates are produced by the phosgenation of the reaction product of aniline and formaldehyde. Such reactions are well known and described in U.S. Pats. 2,683,730; 3,277,173; 3,344,162 and 3,362,979 for example. The polyaryl isocyanates thus formed have functionalities greater than two which can be varied up to high functionality materials. The product is usually a mixture of high functionality material with the diisocyanate resulting in an average. It is this average that is referred to as the functionality of the isocyanate. It is preferred that the functionality be from two to about four, and especially preferred that the functionality of the polymethylene polyphenyl isocyanate used in the practice of our invention be from about 2.3 to about 3.5. Other organic isocyanates are described in U.S. Pat. 3,194,773 for example.

In the production of polyurethane foams in the practice of our invention, other known additives are necessary. One such constituent is the blowing agent. Some examples of well-known blowing agents are water, methylene chloride, trichloromonofluoromethane, dichlorodiflouromethane, dichloromonofluoromethane, 1,1-dichloro-1-fluoromethane, 1,1-difluoro - 1,2,2 - trichloromethane, chloropentafluoroethane, and the like.

Many catalysts of urethane formation are useful in the practice of our invention. Such catalysts, which either may be used alone or in combination with other catalysts, are, for example, dimethylaminomethanol, tetramethyl-1,3-propanediamine, triethylenediamine, tetramethyl-1,3-butanediamine, dimethylethanolamine, methyltriethylenediamine, N-methylmorpholine, N-ethylmorpholine, and the like. There are many tertiary amine catalysts which are useful and well known to those skilled in the art both as to the preparation which should be used and the catalyst compounds themselves.

Another class of useful polyurethane catalyst are organo-metallic catalysts including organo tin, mercury, lead, bismuth and arsenic compounds for example. Specifically, these other suitable catalysts include arsenic trichloride, antimony trichloride, antimony pentachloride, antimony tributoxide, bismuth trichloride, titanium tetrachloride, bis(cyclopentadienyl) titanium difluoride, titanium chelates such as octylene glycol titanate, dioctyl lead dichloride, dioctyl lead diacetate, dioctyl lead oxide, trioctyl leadchloride, trioctyl lead hydroxide, trioctyl lead acetate, copper chelates such as copper acetylacetonate and mercury salts. Particularly useful organo tin catalysts are described in U.S. Pat. 3,194,773 for example.

Either class of catalyst can be used either alone or as a catalyst blend and is generally employed in catalytic amounts such as from about 0.1 wt. percent to about 6 wt. percent based upon the weight of the polyoxyalkylene resin.

Surfactant agents, better known as silicone oils, are added to serve as a cell stabilizer. Some representative materials are sold under the names of SF–1109, L–520, L–521 and DC–193 which are generally polysiloxane polyoxyalkylene blocked copolymers, such as those disclosed in U.S. Pats. 2,834,748; 2,917,480; 2,846,458; and 3,194,773 for example.

Should fire retardance be required for the polyurethane foam, two types of fire retardants are available; those that are incorporated by mere mechanical mixing and those that become chemically bound in the polymer chain. Representative of the first type are tris(chloroethyl) phosphate, tris(2,3-dibromopropyl) phosphate, diammonium phosphate, various halogenated compounds and antimony oxide. Representative of the chemically bound type are chlorendic acid derivatives, and various phosphorus containing polyols.

There are two well known methods suitable for the manufacture of the polyurethane form of this invention— the one shot method and the prepolymer method.

In the one shot method, all of the components are mixed together at once and the reaction occurs in one step. In the prepolymer method, only a portion of the polyoxyalkylene resin is initially reacted with the isocyanate to form a so-called prepolymer having an excess of free, or unreacted, isocyanate groups. When foam is desired the rest of the polyol and the other ingredients are added to this prepolymer and the foam is formed. Both methods have advantages and drawbacks and it is within the understanding of one skilled in the art to select the method most desirable under specific circumstances.

Our invention will be further illustrated with reference to the following specific examples which are given by way of illustration rather than by way of limitation on the scope of this invention.

Example I

This example will illustrate the use of a partially aminated polyol (6500 molecular weight) in the preparation of flexible urethane foam from crude and distilled toluene diisocyanate. It will further show the increased but useful curing rate (reduced gel time) of the resin of this invention during foam preparation as compared to prior art polyols having no amino groups. The foams labeled "A" and "C" below were prepared using the partially aminated polyoxyalkylene resin formed by reacting the 6500 molecular weight polyoxyalkylene triol (75% primary hydroxyl) used to make the foams labeled "B" and "D" with ammonia in accordance with the procedure previously described.

TABLE 1.—PREPARATION OF FLEXIBLE FOAM FROM PARTIALLY AMINATED POLYALKYLENE RESINS

| Foam number | A | B | C | D |
|---|---|---|---|---|
| Formulation, pbw.: | | | | |
| 6,500 molecular weight polyoxyalkylene resin (23% amine groups) | 97 | | 97 | |
| 6,500 molecular weight triol having 75% primary hydroxyl groups | | 97 | | 97 |
| Water | 3.0 | 3.0 | 3.0 | 3.0 |
| LD-813 crosslinking agent [b] | 3.0 | 3.0 | 3.0 | 3.0 |
| DC-200 silicone fluid [d] | 0.05 | 0.05 | 0.05 | 0.05 |
| Triethylene diamine (Dabco 33LV [c]) | 0.75 | 0.75 | 0.75 | 0.75 |
| Hylene 2783-30 [a] | | | 39.8 | 39.8 |
| Toluene diisocyanate | 36.5 | 36.5 | | |
| NCO/OH | 1.05 | 1.05 | 1.05 | 1.05 |
| Details of preparation: | | | | |
| Cream time, sec | 8-10 | 10-12 | 8 | 10 |
| Rise time, sec | 120 | 120 | 160 | 160 |
| Gel time, sec | 165 | 188 | 260 | 280 |

[a] E. I. du Pont de Nemours & Co., crude TDI.
[b] E. I. du Pont de Nemours & Co.
[c] Houdry Process Corporation.
[d] Dow Corning.

The gel time was determined in the following manner. First, a "BB" was dropped from a height of six inches onto the surface of a freshly poured form. The point at which no cells were exposed around the perimeter of the "BB," after it had settled into the foam surface, was interpreted as the gel time.

Example II

This example will illustrate the preparation of a flexible foam from the polyoxyalkylene resin of this invention and a polymeric, MDI-type, isocyanate with a functionality of 2.2. It will further show the faster cure rate of the polyols of this invention as compared to foams derived from prior art nonaminated polyols. Formulations and processing details are shown in the following Table 2.

TABLE 2.—FLEXIBLE FOAMS FROM PARTIALLY AMINATED POLYOLS AND POLYMETHYLENEPOLYPHENYL ISOCYANATES

| Foam number | E | F |
|---|---|---|
| Formulation, pbw.: | | |
| Aminated resin of Example I | 100 | |
| Triol of Example I | | 100 |
| Water | 3.0 | 3.0 |
| Triethylene diamine | 0.75 | 0.75 |
| Polymethylenepolyphenylisocyanate functionality of 2.2 | 52.2 | 52.2 |
| NCO/OH | 1.05 | 1.05 |
| Details of preparation: | | |
| Cream time, sec | 15 | 15 |
| Rise time, sec | 300 | 330 |
| Gel time, sec | 450 | 480 |

Example III

This example will demonstrate the preparation of flexible foams using the polyoxyalkylene resin of this invention. It will further show that prior art polyols when blended with totally aminated triols become uncontrollably reactive or give unstable foams even when the concentration of the totally aminated triol is low (10–20%). This example also illustrates the improved gel time resulting from the practice of this invention as opposed to blends. Formulations and details of preparation are shown in the following Table 3.

TABLE 3

| Foam number | G | H | J | K |
|---|---|---|---|---|
| Formulation, pbw.: | | | | |
| Aminated resin of Example I | 97 | | | |
| Triol of Example I | | 77.6 | 87.3 | 92.1 |
| 3,000 molecular weight totally aminated polyoxyalkylene triol | | 19.4 | 9.7 | 4.9 |
| Water | 3.0 | 3.0 | 3.0 | 3.0 |
| LD-813 | 3.0 | 3.0 | 3.0 | 3.0 |
| DC-200 silicone | 0.05 | 0.05 | 0.05 | 0.05 |
| Dabco WT (triethylenediamine) | 0.75 | 0.75 | 0.75 | 0.75 |
| Toluene diisocyanate | 36.5 | 37.6 | 37.0 | 36.8 |
| NCO/OH | 1.05 | 1.05 | 1.05 | 1.05 |
| Details of preparation: | | | | |
| Cream time, sec | 8 | [1] | 12 | 12 |
| Rise time, sec | 110 | [1] | 135 | 120 |
| Gel time, sec | 170 | [1] | 230-240 | 330 |
| Results: Foam appearance | [2] | | [3] | [2] |

[1] Too fast to determine, gelled on stirrer.
[2] Good foam, no shrinkage.
[3] Considerable shrinkage on cooling.

While foam K using a blend with a totally aminated polyol was satisfactory, the gel time was 94% longer than foam G of our invention. While foam J was about 37% slower the foam resulting was unsatisfactory due to the shrinkage.

Example IV

This example will illustrate the preparation of molded foams from the polyoxyalkylene resins of this invention. It will further show the improved physical properties (particularly compression set) of foams from the resin of this invention as compared to those from prior art polyols. Compression set (Method B, constant deflection) is measured as a percent of the original deflection after a sample is compressed and held at a specified deflection (50% or 75%) for 22 hours as described in test procedure ASTM D–1564–71. In this example, the ingredients were mixed in a one quart paper cup and poured into a 12-inch x 12-inch x 2-inch closed aluminum mold which had been coated with a suitable mold release agent. Formulations, details of preparation and foam properties are summarized in Table 4 following.

TABLE 4

| Foam number | L | M | N | O | P |
|---|---|---|---|---|---|
| Formulation, pbw.: | | | | | |
| 6,500 M.W. triol, 75% primary OH | 97 | | | | |
| Aminated 6,500 molecular weight resin (19% NH₂) | | 97 | | | |
| Do | | | 97 | | |
| Aminated 6,500 molecular weight resin (20% NH₂) | | | | 97 | |
| Do | | | | | 97 |
| LD-813 | 3.0 | 3.0 | 3.0 | 3.0 | 3.0 |
| Water | 3.0 | 3.0 | 3.0 | 3.0 | 3.0 |
| DC-200 silicone | 0.05 | 0.05 | 0.05 | 0.05 | 0.05 |
| Dabco WT | 0.75 | 0.75 | 0.75 | 0.75 | 0.75 |
| Hylene 2783-30 | 39.9 | 39.9 | 39.9 | 39.9 | 39.9 |
| NCO/OH | 1.05 | 1.05 | 1.05 | 1.05 | 1.05 |
| Details of preparation: | | | | | |
| Mold temperature, F | 122 | 125 | 120 | 125 | 120 |
| Release time, min | 18 | 16 | 25 | 17 | 15 |
| Postcure, °C. (hr.) | 100 (1) | 100 (1) | 50 (3.5) | 100 (1) | 100 (1) |
| Properties: | | | | | |
| Density, p.c.f. (molded) | 4.19 | 4.04 | 4.2 | 4.04 | 4.06 |
| Tensile, p.s.i | 35.3 | 40.5 | 35.7 | 28.9 | 30 |
| Elongation, percent | 200 | 166 | 192 | 165 | 163 |
| Tear, p.l.i | 3.6 | 4.0 | 4.5 | 3.2 | 3.1 |
| Compression set: | | | | | |
| 50% | 38 | 32 | 32 | 23.7 | 21 |
| 75% | 80 | 30 | 44 | 19 | 19 |

Example V

This example will illustrate the preparation of molded flexible foam from aminated 5500 molecular weight triols. It will further show that they can easily be formulated in one shot foam formulations without a significant decrease in cream time. The molded foams were prepared as described in Example IV. Formulations, details of preparation and foam properties are shown in the following table.

TABLE 5.—MOLDED FOAMS FROM PARTIALLY AMINATED 5500 MOLECULAR WEIGHT TRIOLS

| Foam number | Q | R | S | T |
|---|---|---|---|---|
| Formulation, pbw.: | | | | |
| Aminated 5,500 molecular weight resin (17% NH₂) | 97 | | | |
| Do | | 97 | | |
| Aminated 5,500 molecular weight resin (26% NH₂) | | | 97 | |
| Aminated 5,500 molecular weight resin (30% NH₂) | | | | 97 |
| LD-813 | 3.0 | 3.0 | 3.0 | 3.0 |
| Water | 3.0 | 3.0 | 3.0 | 3.0 |
| DC-200 silicone | 0.05 | 0.05 | 0.05 | 0.05 |
| Dabco WT (triethylenediamine) | 0.75 | 0.75 | 0.75 | 0.75 |
| Hylene 2783-30 | 39.9 | 39.9 | 39.9 | 39.9 |
| NCO/OH | 1.05 | 1.05 | 1.05 | 1.05 |
| Details of preparation: | | | | |
| Mold temp., F | 110-115 | 110-115 | 110-115 | 110-115 |
| Release time, min | 15 | 15 | 15 | 15 |
| Postcure. °C. (hr.) | 100-110(1) | 100-110(1) | 110-110(1) | 100-110(1) |
| Cream time, sec | 10 | 10 | 8 | 9 |
| Rise time, sec | 135-140 | 140-145 | 120 | 130 |
| Properties: | | | | |
| Density, p.c.f. (molded) | 4.16 | 4.18 | 4.08 | 4.0 |
| Tensile, p.s.i | 28.5 | 28.9 | 26.5 | 27.5 |
| Elongated, percent | 108 | 123 | 110 | 125 |
| Tear, p.l.i | 2.08 | 2.15 | 2.4 | 2.3 |
| Compression set: | | | | |
| 50% | 21.1 | 22.9 | 22.2 | 20 |
| 75% | 4.8 | 15.4 | 17 | 19.5 |

The above described and exemplified invention may be embodied in other forms or carried out in other ways without departing from the spirit or essential characteristics thereof. The present embodiment is therefore to be considered in all respects illustrative and not restrictive and modifications and variations of the invention as hereinbefore set forth may be made without departing from the spirit and scope thereof.

What is claimed is:

1. A cellular polyurethane foam formed by reacting, in the presence of a blowing agent, an organic polyisocyanate and a partially aminated polyol comprising a polyoxyalkylene polyol having a hydroxyl functionality of from 2 to 8 and an equivalent weight of from about 900 to about 2800 wherein from about 10 percent to about 50 percent of the hydroxyl groups have been replaced by primary amino groups.

2. The cellular polyurethane foam of claim 1 wherein the polyoxyalkylene polyol has a hydroxyl functionality of three.

3. The cellular polyurethane foam of claim 1 wherein the partially aminated polyol has from about 10% to about 50% primary amino groups, about 40% to about 80% primary hydroxyl groups and 0% to about 25% secondary hydroxyl groups.

4. The cellular polyurethane foam of claim 3 wherein the partially aminated polyol is derived from a polyoxyalkylene polyol having a hydroxyl functionality of three.

5. The cellular polyurethane foam of claim 4 wherein the partially aminated polyol has an equivalent weight of about 1500 to about 2300.

References Cited

UNITED STATES PATENTS

| 3,666,788 | 5/1972 | Rowton | 260—77.5 AQ |
| 3,436,359 | 4/1969 | Hubin | 260—2.5 AQ |
| 3,267,050 | 8/1966 | Kuryla | 260—2.5 AQ |
| 3,179,606 | 4/1965 | Prescott | 260—584 C |

DONALD E. CZAJA, Primary Examiner

C. W. IVY, Assistant Examiner

U.S. Cl. X.R.

260—77.5 AQ